(12) United States Patent
Liao et al.

(10) Patent No.: US 7,675,576 B2
(45) Date of Patent: Mar. 9, 2010

(54) VIDEO PROCESSING APPARATUS AND METHOD THEREOF

(75) Inventors: Cheng-Shun Liao, Chang-Hua Hsien (TW); Chia-Pei Chang, Hsin-Chu (TW); Yi-Shu Chang, Hsin-Chu Hsien (TW); Ming-Chun Chang, Chia-I (TW)

(73) Assignee: Realtek Semiconductor Corp., HsinChu (TW)

( * ) Notice: Subject to any disclaimer, the term of this patent is extended or adjusted under 35 U.S.C. 154(b) by 1155 days.

(21) Appl. No.: 11/164,066

(22) Filed: Nov. 9, 2005

(65) Prior Publication Data

US 2006/0098948 A1 May 11, 2006

(30) Foreign Application Priority Data

Nov. 10, 2004 (TW) .............................. 93134291 A

(51) Int. Cl.
*H04N 7/00* (2006.01)
*H04N 11/00* (2006.01)
*H04N 5/50* (2006.01)
*H04N 9/76* (2006.01)

(52) U.S. Cl. .................. 348/584; 348/465; 348/468; 348/569; 348/598; 348/600; 348/659; 386/95

(58) Field of Classification Search ................ 348/465, 348/468, 569, 584, 598, 600, 659; 386/45, 386/95, 125, 126
See application file for complete search history.

(56) References Cited

U.S. PATENT DOCUMENTS

| | | | | |
|---|---|---|---|---|
| 4,825,390 A * | 4/1989 | Van Aken et al. | .......... | 345/600 |
| 5,684,542 A * | 11/1997 | Tsukagoshi | ................. | 348/468 |
| 5,847,770 A * | 12/1998 | Yagasaki | .................... | 348/563 |
| 5,889,564 A * | 3/1999 | Tsukagoshi | ................. | 348/594 |
| 5,987,214 A * | 11/1999 | Iwamura | ...................... | 386/95 |
| 5,999,225 A * | 12/1999 | Yagasaki et al. | ............ | 348/564 |
| 6,031,577 A * | 2/2000 | Ozkan et al. | ................ | 348/465 |
| 6,067,653 A * | 5/2000 | Tsukagoshi | ................. | 714/746 |
| 6,081,300 A * | 6/2000 | Beyers et al. | ............... | 348/589 |
| 6,115,077 A * | 9/2000 | Tsukagoshi | ................. | 348/607 |
| 6,169,843 B1 * | 1/2001 | Lenihan et al. | ............... | 386/46 |
| 6,175,388 B1 * | 1/2001 | Knox et al. | ................. | 348/569 |
| 6,204,883 B1 * | 3/2001 | Tsukagoshi | ................. | 348/468 |
| 6,226,047 B1 * | 5/2001 | Ryu | .......................... | 348/569 |
| 6,330,036 B1 * | 12/2001 | Murakami et al. | ......... | 348/555 |
| 6,373,530 B1 * | 4/2002 | Birks et al. | ................. | 348/584 |
| 6,415,100 B1 * | 7/2002 | Park | ........................... | 386/95 |
| 6,424,792 B1 * | 7/2002 | Tsukagoshi et al. | .......... | 386/95 |
| 6,437,787 B1 * | 8/2002 | Wu | ............................ | 345/519 |
| 6,493,005 B1 * | 12/2002 | Wu | ............................ | 715/804 |
| 6,570,626 B1 * | 5/2003 | Mendenhall et al. | ....... | 348/569 |
| 6,621,866 B1 * | 9/2003 | Florencio et al. | ....... | 375/240.25 |
| 6,658,057 B1 * | 12/2003 | Chen et al. | ................. | 375/240 |
| 6,665,020 B1 * | 12/2003 | Stahl et al. | ................. | 348/552 |

(Continued)

*Primary Examiner*—Brian P Yenke
(74) *Attorney, Agent, or Firm*—Winston Hsu

(57) ABSTRACT

A video processing apparatus includes: a line-based data encoder for performing line-based data encoding on an input signal to generate a line-based data encoded signal; and a video signal controller coupled to the line-based data encoder for receiving a first video signal and the line-based data encoded signal, decoding the line-based data encoded signal to generate a second video signal, and choosing one of the first and second video signals to generate an output signal.

16 Claims, 3 Drawing Sheets

U.S. PATENT DOCUMENTS

| | | | |
|---|---|---|---|
| 6,754,435 B2 * | 6/2004 | Kim | 386/69 |
| 6,763,067 B2 * | 7/2004 | Hurst | 375/240.03 |
| 6,788,347 B1 * | 9/2004 | Kim et al. | 348/441 |
| 6,873,368 B1 * | 3/2005 | Yu et al. | 348/441 |
| 6,961,382 B1 * | 11/2005 | Yu et al. | 375/240.25 |
| 7,116,377 B2 * | 10/2006 | Zeidler et al. | 348/569 |
| 7,126,993 B2 * | 10/2006 | Kitamura et al. | 375/240.26 |
| 7,167,640 B2 * | 1/2007 | Gadre et al. | 386/125 |
| 7,202,912 B2 * | 4/2007 | Aneja et al. | 348/569 |
| 7,304,686 B2 * | 12/2007 | Miyazawa | 348/569 |
| 2003/0021586 A1 * | 1/2003 | Suh | 386/95 |
| 2003/0068157 A1 * | 4/2003 | Kushibe et al. | 386/69 |
| 2004/0081434 A1 * | 4/2004 | Jung et al. | 386/95 |
| 2004/0240859 A1 * | 12/2004 | Karimoto et al. | 386/111 |
| 2005/0212969 A1 * | 9/2005 | Chen | 348/569 |
| 2005/0243210 A1 * | 11/2005 | Lee | 348/564 |
| 2006/0164547 A1 * | 7/2006 | Lin | 348/520 |

* cited by examiner

VIDEO PROCESSING APPARATUS AND METHOD THEREOF

BACKGROUND OF THE INVENTION

1. Field of the Invention

The present invention relates to digital televisions (TVs), and more particularly, to a video processing apparatus and a method thereof.

2. Description of the Prior Art

Within a digital television (TV), a controller chip typically utilizes a blending module to blend video data from different sources, e.g., video frames transmitted from content/service providers, logo information, scrolling banner information, caption information, and/or on-screen display (OSD) information generated by the digital TV. The blended data is then transmitted to a display panel for further display. Real time calculation and display for the video data from these different sources mentioned above require a portion of bus bandwidth of the digital TV.

An example of typically encoded information transmitted from the content/service provider is subtitle data, including logo information, scrolling banner information, and/or caption information. The subtitle data is decoded by a subtitle decoder and converted into corresponding image data. After certain processing operations such as scaling and/or filtering, the image data is then blended with the other video data mentioned above, e.g. the video frames and the OSD information. The amount of the image data generated in the scaling and filtering processing is considerably large. As a result, the bus bandwidth of the digital TV is heavily occupied, and therefore the overall display performance of the digital TV becomes significantly hindered.

SUMMARY OF THE INVENTION

It is therefore an objective of the claimed invention to provide a video processing apparatus and method, which can alleviate burden imposed upon the bandwidth of an internal bus.

According to embodiments of the invention, a video processing apparatus is disclosed. The video processing apparatus comprises: an encoder for encoding an input signal to generate an encoded signal; and a blending circuit coupled to the encoder for blending a first video signal and a second video signal corresponding to the encoded signal to generate an output signal.

According to embodiments of the invention, a video processing method is further disclosed. The video processing method comprises: encoding an input signal to generate an encoded signal; and blending a first video signal and a second video signal corresponding to the encoded signal to generate an output signal.

According to embodiments of the invention, a video processing apparatus is further disclosed. The video processing apparatus comprises a shared data bus; a data encoder coupled to the shared data bus, for encoding a first video signal and transmitting the encoded first video signal through the shared data bus; a data decoder coupled to the shared data bus, for receiving the encoded first video signal from the shared data bus and decoding the encoded first video signal; and a blending module coupled to the data decoder, for blending the first video signal decoded by the data decoder and a second video signal, to generate a blended video signal.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
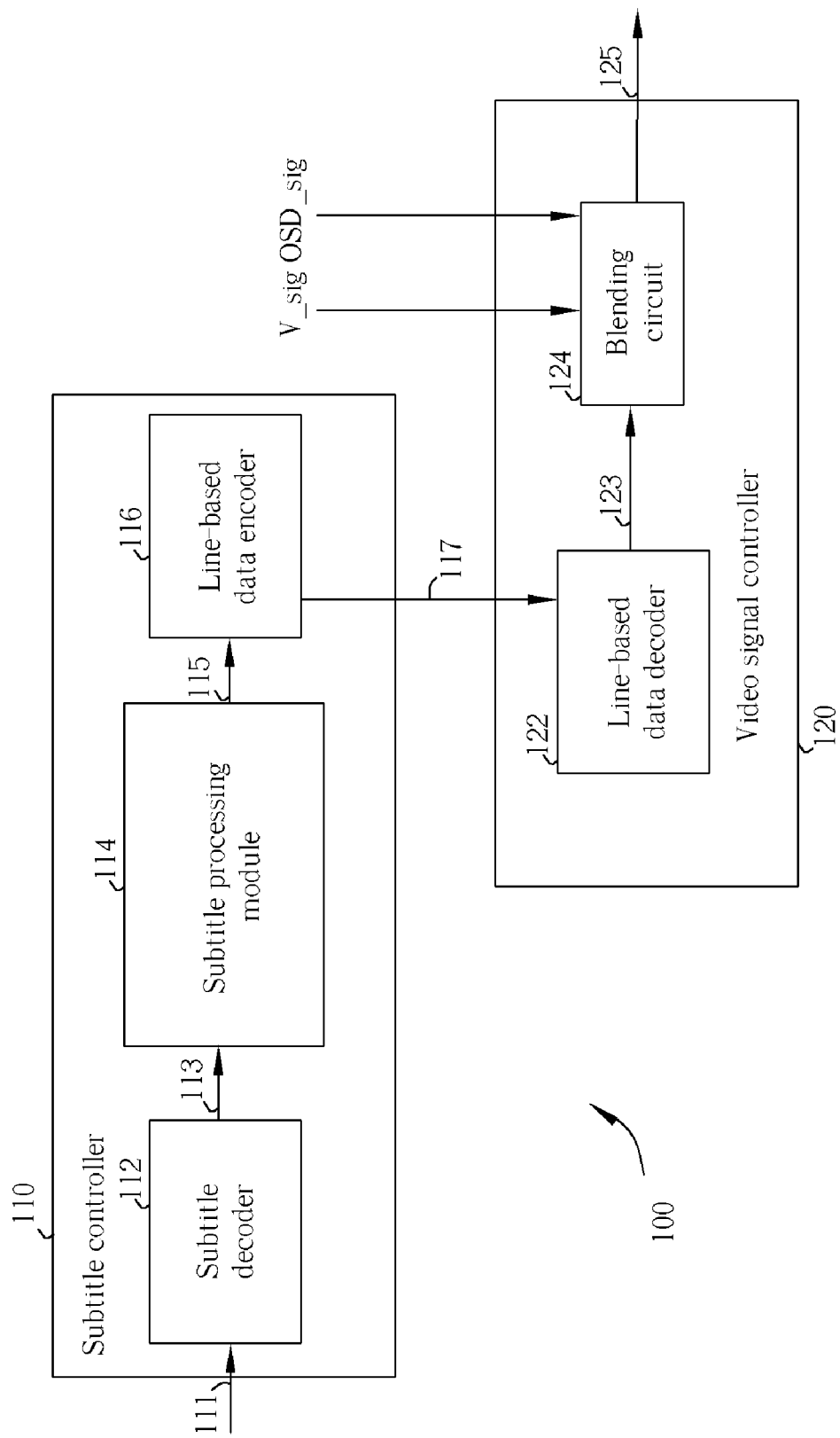
FIG. 1 is a diagram of a video processing apparatus according to one embodiment of the present invention.

Please refer to FIG. 1. FIG. 1 is a diagram of a video processing apparatus 100 according to one embodiment of the present invention, wherein the video processing apparatus 100 comprises a subtitle controller 110 and a video signal controller 120. The subtitle controller 110 comprises a subtitle decoder 112, a subtitle processing module 114, and a line-based data encoder 116, and the video signal controller 120 comprises a line-based data decoder 122 and a blending circuit 124. In this embodiment, the video processing apparatus 100 is installed in a digital television (TV), wherein the video signal controller 120 is coupled to the subtitle controller 110 through a data bus in the digital TV.

It should be noted that although the video processing apparatus 100 of this embodiment is installed in the digital TV as mentioned above, those skilled in the art will appreciate that the video processing apparatus 100 can be applied to other products requiring similar video processing, according to other embodiments of the present invention.

The subtitle decoder 112 shown in FIG. 1 is utilized for decoding subtitle data 111, such as caption information, logo information, and/or scrolling banner information, to generate a subtitle decoded signal 113. In this embodiment, the subtitle processing module 114 is capable of performing processing operations such as scaling and image enhancement calculations, or various other calculation operations for subtitle processing, which are well known to those skilled in the art. After processing such as subtitle decoding and scaling calculation is carried out, a large amount of data will be generated, and then sent to the line-based data encoder 116 for further encoding. According to this embodiment, the line-based data encoder 116 performs line-based data encoding on these data carried on the input signal 115 to generate a line-based data encoded signal 117, which has less amount of data in contrast to the input signal 115. The line-based data encoded signal 117 is then sent to the video signal controller 120, whereby the loading on the bus bandwidth of the digital TV can be saved.

Figure 2:
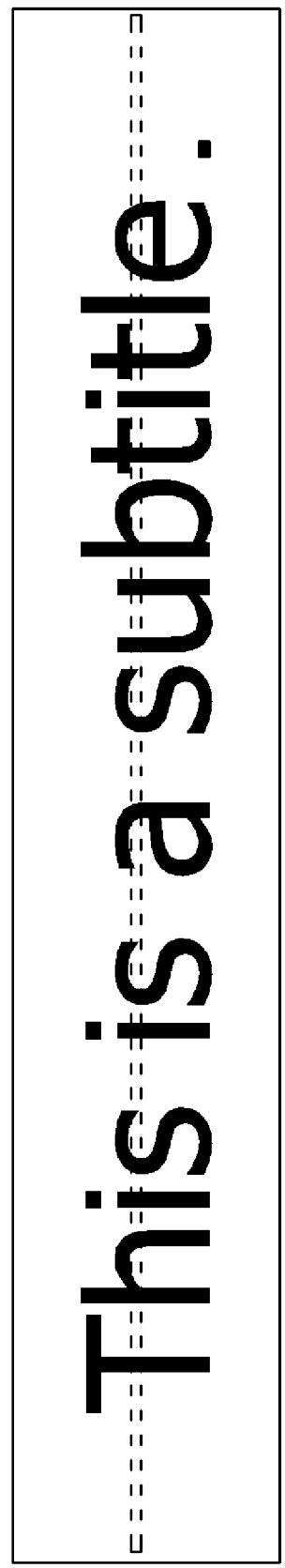
FIG. 2 is a diagram illustrating caption data processed by the line-based data encoder shown in FIG. 1.

In this embodiment, the line-based data encoder 116 compresses and encodes one row, or one line, of data (hence line-based), based on each row of pixel data of the image represented by the input signal 115, for example, the dashed-line-enclosed portion of an embodiment closed caption as shown in FIG. 2, and then appends a header to the encoded data, to generate the line-based data encoded signal 117. As each set of line-based data comprises a header and a set of encoded data, the header can be utilized to distinguish between two sets of encoded data in the line-based data encoded signal 117. According to this embodiment, the line-based data encoder 116 encodes the input signal 115 according to Huffman encoding algorithm to generate the line-based data encoded signal 117, and the line-based data decoder 122 is capable of decoding the line-based data encoded signal 117 correspondingly.

Utilizing each row of pixels as a unit of encoding to perform data compression/encoding is advantageous to the design of the later stage blending circuit 124. The blending circuit 124 typically blends video data of different sources on a pixel-row, or line, basis, and a display panel of the digital TV typically displays the blended data on a pixel-row basis; that is, data are blended and displayed each row of pixels a time. Therefore, the system architecture and control can be most simplified while utilizing pixel row as unit for data compression/encoding and the corresponding decoding.

However, such an implementation mentioned above is not meant to serve as a limitation for the present invention. This is merely one of the various implementation choices of the present invention. In another embodiment of the present invention, other kinds of line-based data encoding algorithms such as Run-Length encoding algorithm, JBIG encoding algorithm, and JPEG encoding algorithm, can also be applied to the line-based data encoder, where the line-based data decoder may decode the line-based data encoded signal correspondingly. In other embodiments, the encoding calculations of the encoder in the subtitle controller may adopt some other encoding units, e.g. block-based encoding or others, instead of pixel-row, or line-based encoding, to encode the input signal.

As shown in FIG. 1, the video signal controller 120 receives, through the line-based data decoder 122, the aforementioned line-based data encoded signal 117, which is transmitted through the data bus. Additionally, the video signal controller 120 further receives, through the blending circuit 124, the on-screen display (OSD) signal OSD_sig and the video signal V_sig, which is transmitted through the data bus and corresponds to the video frames. In addition, a video signal 123, which is generated by the line-based data decoder 122 after the line-based data decoder 122 performs line-based data decoding on the line-based data encoded signal 117, is also transmitted to the blending circuit 124. The blending circuit 124 then blends the OSD signal OSD_sig, the video signal V_sig, and the video signal 123 corresponding to the line-based data encoded signal 117, to generate an output signal 125, which carries calculation results of the blending calculations performed by the blending circuit 124. The blending calculations are well known to those skilled in the art, and therefore are not described in detail herein.

Figure 3:
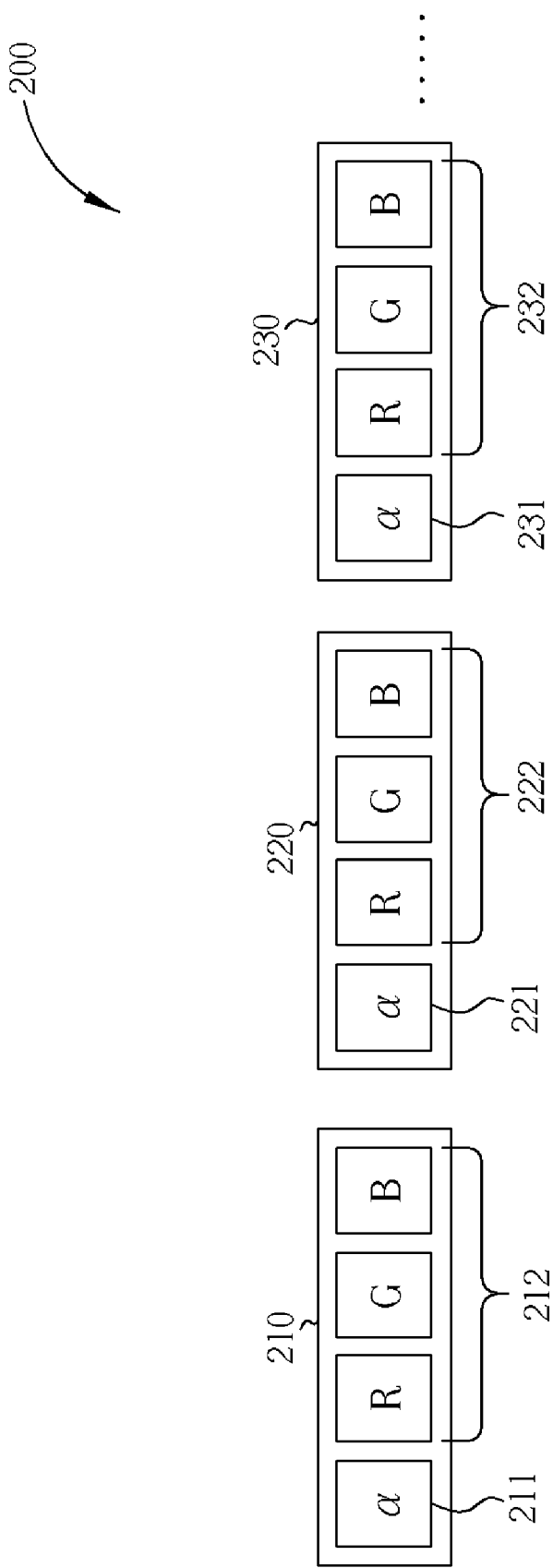
FIG. 3 is a diagram illustrating pixel data processed by the line-based data encoder shown in FIG. 1.

Please refer to FIG. 3. FIG. 3 is a diagram illustrating pixel data processed by the line-based data encoder 116 shown in FIG. 1. In this embodiment, the input signal 115 comprises a plurality of pixels complying with ARGB specifications, and each pixel comprises pixel values of $\alpha$, R, G, and B, where the pixel value of $\alpha$ represents transparency. In order to raise the data compression rate, when the $\alpha$ value 221 of a pixel 220 in the input signal 115 appears to be zero, which means that the pixel 220 eventually is not to be shown in the resulting output image and that the R, G, and B values bear no consequence, the pixel values of R, G, and B 222 can then be set so as to increase the compression rate, and hence minimize the data flow through the data bus.

In one embodiment, when an $\alpha$ value of a pixel is zero, the line-based data encoder 116 sets the R, G, and B values of this pixel according to those of a previous pixel before encoding. For example, when the blending values, e.g. the $\alpha$ values 221 and 231 respectively corresponding to the pixels 220 and 230 in the input signal 115, are both zero, the line-based data encoder 116 sets the pixel data 222 and 232 (i.e. the R, G, and B values of the pixels 220 and 230, respectively) to be the same as the pixel data 212 (i.e. the R, G, and B values of the pixels 210) before performing the line-based data encoding. In another embodiment, when $\alpha$ values of a plurality of pixels are zero, the line-based data encoder 116 sets the R, G, and B values of these pixels to certain predetermined value before encoding. For example, when the blending values, e.g. the $\alpha$ values 221 and 231, are zero, the line-based data encoder 116 sets all the values of the pixel data 222 and 232 to be zero before performing the line-based data encoding.

Those skilled in the art will readily observe that numerous modifications and alterations of the apparatus and method may be made while retaining the teachings of the invention. Accordingly, the above disclosure should be construed as limited only by the metes and bounds of the appended claims.

What is claimed is:

1. A video processing apparatus, comprising:
   a subtitle controller arranged to decode subtitle data, the subtitle controller comprising:
      an encoder for encoding an input signal to generate an encoded signal, wherein the input signal carries information of decoded subtitle data; and
   a video signal controller arranged to blend a first video signal and a second video signal corresponding to the encoded signal to generate an output signal, the video signal controller comprising:
      a decoder for decoding the encoded signal to generate the second video signal;
   wherein the video signal controller is coupled to the encoder through the decoder;
   and the video signal controller receives, through the decoder, the encoded signal.

2. The video processing apparatus of claim 1, wherein each row of pixels in an image represented by the input signal is utilized as an encoding unit of the encoder.

3. The video processing apparatus of claim 1, wherein the encoder is a data compression encoder; and the encoder encodes the input signal according to an algorithm, and the decoder decodes the encoded signal correspondingly.

4. The video processing apparatus of claim 3, wherein the encoder encodes according to one algorithm from the Huffman encoding algorithm, Run-Length encoding algorithm, JBIG encoding algorithm, and JPEG encoding algorithm.

5. The video processing apparatus of claim 1, wherein the video signal controller is coupled to the encoder through a data bus.

6. The video processing apparatus of claim 1, wherein the subtitle controller further comprises:
   a subtitle decoder arranged to decode the subtitle data to generate a subtitle decoded signal; and
   a subtitle processing module arranged to perform subtitle processing on the subtitle decoded signal in order to generate the input signal carrying the information of the decoded subtitle data;
   wherein the encoder is coupled to the subtitle processing module.

7. The video processing apparatus of claim 1, wherein the subtitle controller further comprises:
   a subtitle decoder arranged to decode the subtitle data;
   wherein the subtitle controller is arranged to perform subtitle processing based upon decoded results of the subtitle decoder in order to generate the input signal carrying the information of the decode subtitle data.

8. The video processing apparatus of claim 7, wherein the subtitle data comprises caption information, logo information, and/or scrolling banner information.

9. The video processing apparatus of claim 7, further comprising:
   a subtitle processing module for processing the decoded results of the subtitle decoder to generate the input signal.

10. The video processing apparatus of claim 9, wherein the subtitle processing module performs processing of scaling, filtering, image enhancement, or any combination thereof.

11. The video processing apparatus of claim 1, wherein the input signal comprises a plurality of pixels complying with ARGB specifications, and each pixel comprises pixel values of α, R, G, and B.

12. The video processing apparatus of claim 11, wherein when the α value is zero, the encoder changes at least one of the R, G, and B values before encoding.

13. The video processing apparatus of claim 12, wherein when the α value is zero, the encoder sets the R, G, and B values to be the same as those of a previous pixel before encoding.

14. The video processing apparatus of claim 12, wherein when the α value is zero, the encoder sets the R, G, and B values to be zero before encoding.

15. The video processing apparatus of claim 1, wherein the first video signal comprises either a video signal corresponding to image frames or an on-screen display (OSD) signal.

16. The video processing apparatus of claim 1, being applied to a digital TV system.

* * * * *